Feb. 28, 1956  J. W. SCHNEIDER  2,736,490
COMPUTING DEVICE
Filed Dec. 19, 1950  6 Sheets-Sheet 1
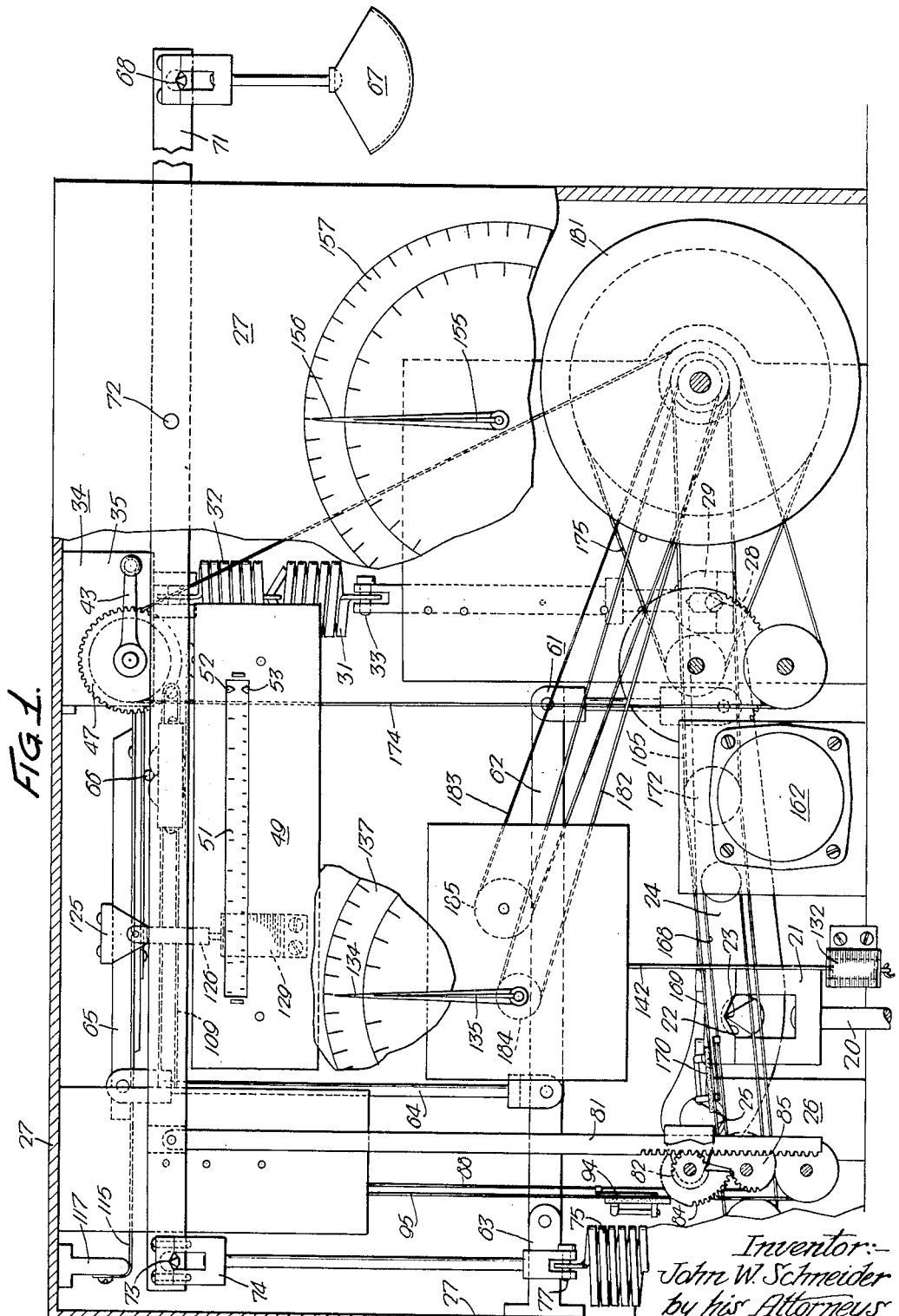
Inventor:-
John W. Schneider
by his Attorneys
Howson & Howson

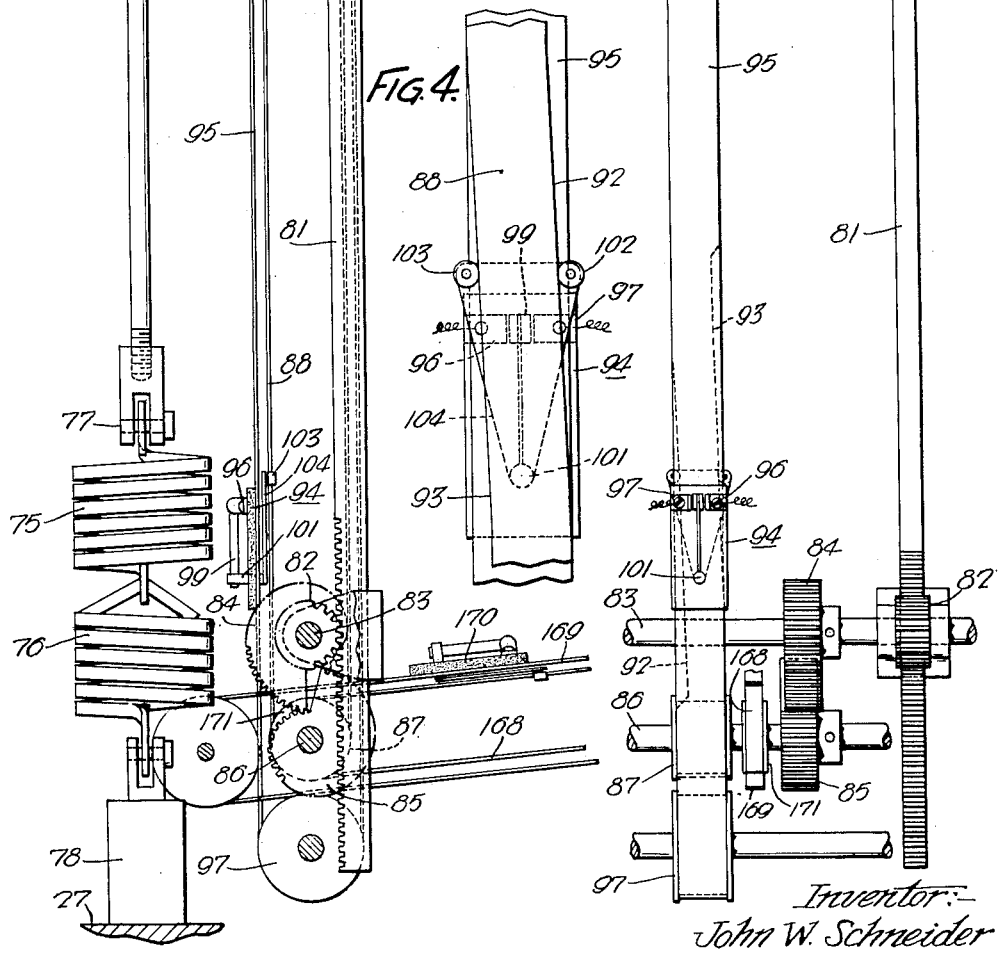

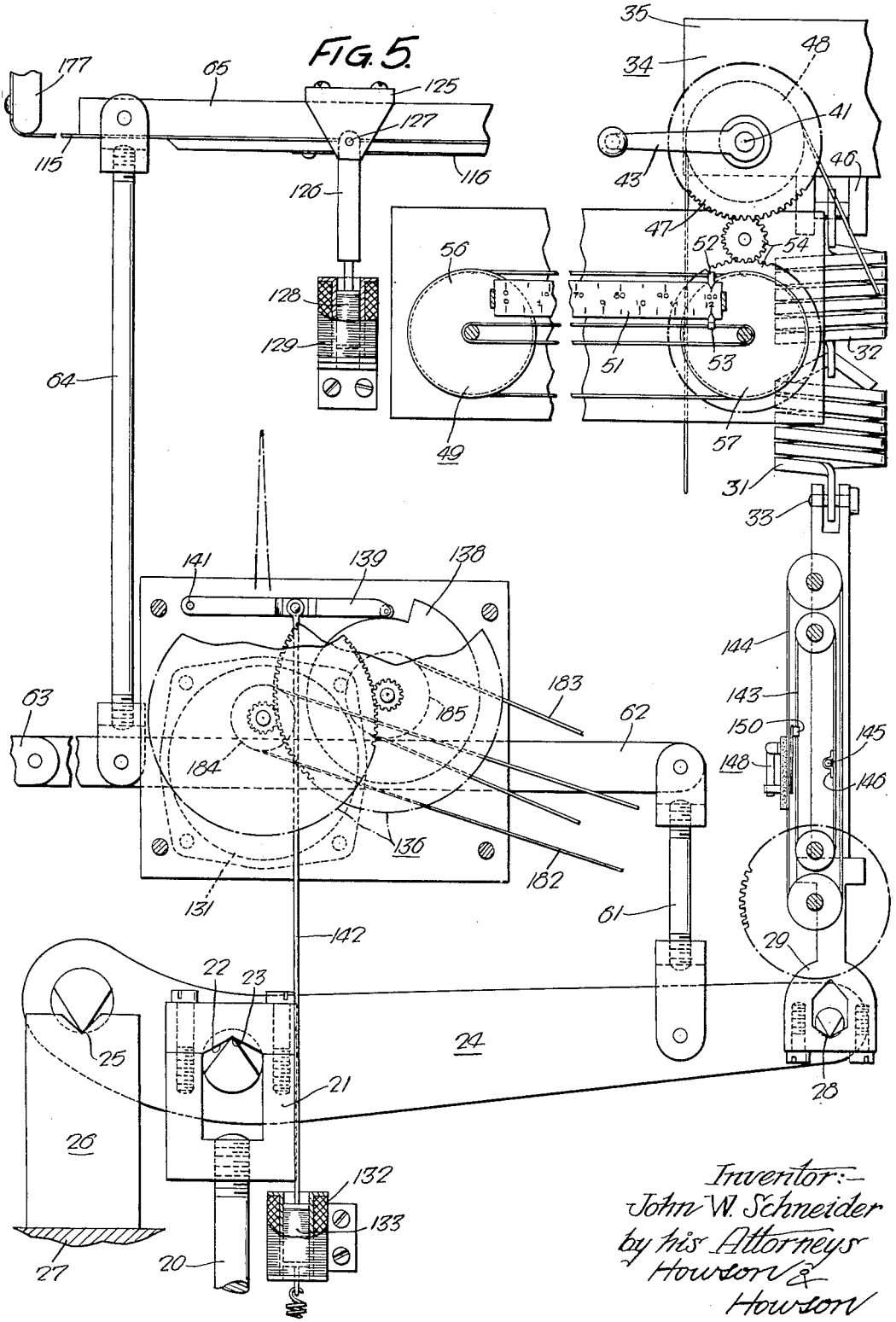

Feb. 28, 1956　　　J. W. SCHNEIDER　　　2,736,490
COMPUTING DEVICE

Filed Dec. 19, 1950　　　　　　　　　　　　　　6 Sheets-Sheet 4

Inventor:—
John W. Schneider
by his Attorneys
Howson &
Howson

Feb. 28, 1956     J. W. SCHNEIDER     2,736,490
COMPUTING DEVICE
Filed Dec. 19, 1950     6 Sheets-Sheet 5
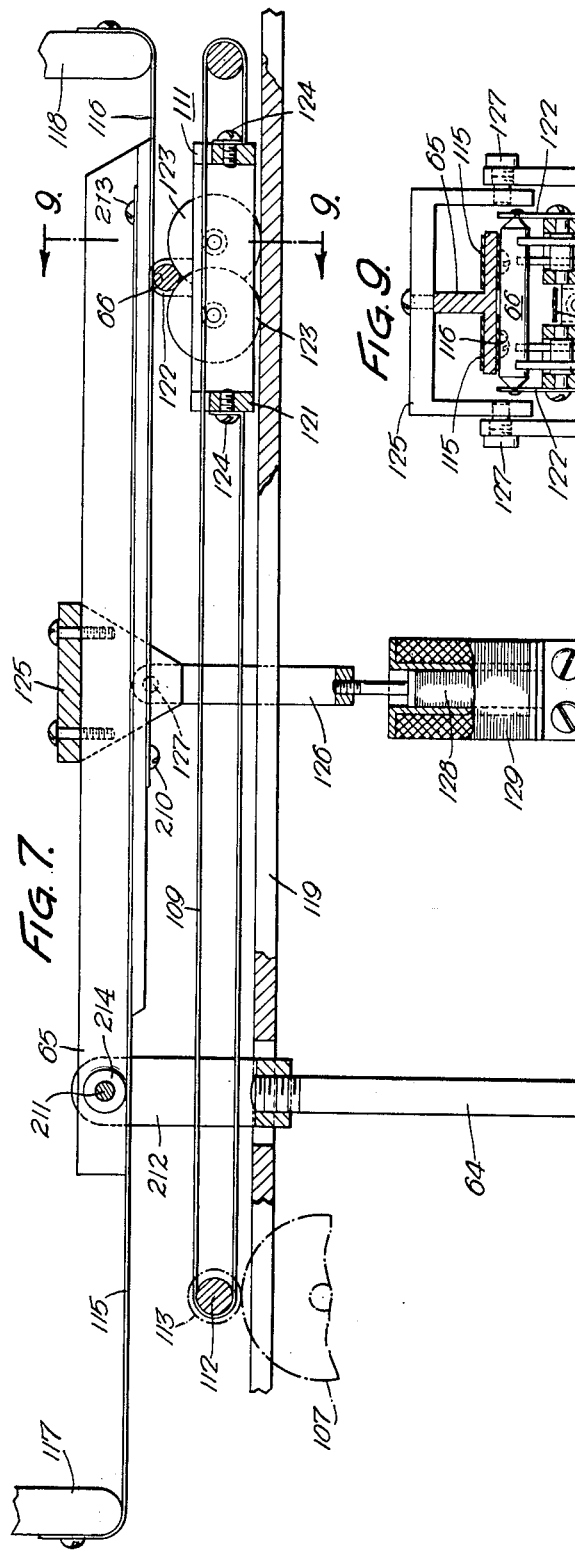
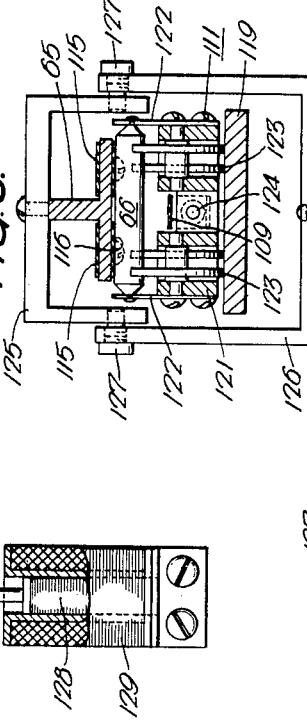
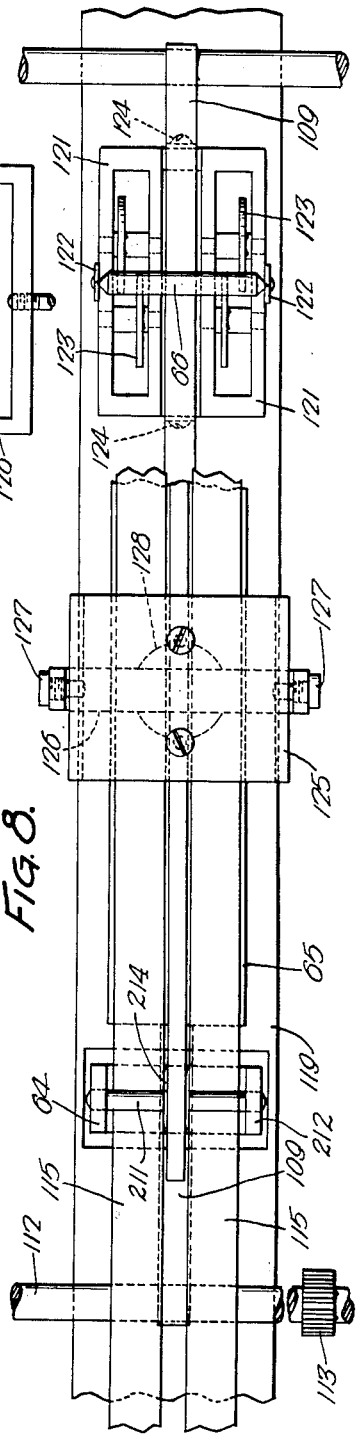
Inventor:—
John W. Schneider
by his Attorneys
Howson & Howson

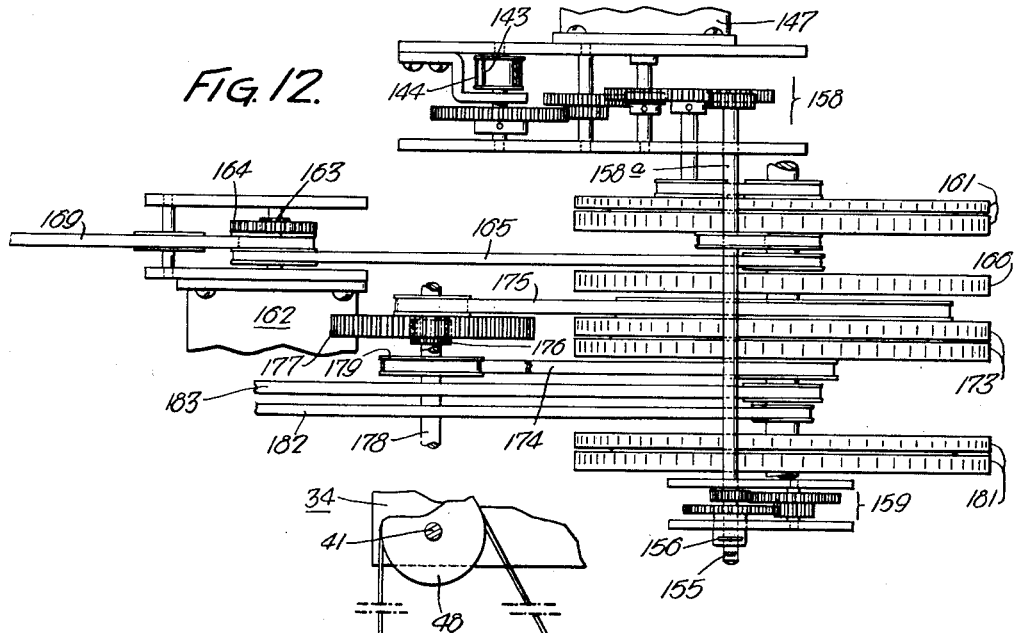

United States Patent Office 2,736,490
Patented Feb. 28, 1956

2,736,490

COMPUTING DEVICE

John W. Schneider, Upper Darby, Pa.

Application December 19, 1950, Serial No. 201,564

10 Claims. (Cl. 235—61)

The present invention relates to new and useful improvements in measuring devices, and more particularly to new and useful improvements in devices operable to determine two separate measurements and compute the ratio between them.

This invention is particularly adaptable to use in conjunction with weighing machines operable to weigh a plurality of small parts and also determine the number of parts being weighed. Prior to the present invention there was no method of accurately determining in one operation the weight and number of a plurality of small parts placed on the scale of a weighing machine. The prior weighing machines would give a means of determining the number of parts placed on the scale of a weighing machine but this was not accurate, and an excess number of parts would always have to be placed on the tray of a weighing machine in order to make up for inaccuracy of the machine. Over a long period of time the result would be that the number of parts actually counted was considerably below the actual number of parts weighed.

Furthermore, with the present invention, it is possible to determine in one operation, the total weight of the parts being weighed, the weight of one part, and the actual number of parts being weighed. A separate scale is provided for each of these readings and these scales are interconnected with printing means so that a permanent record may be made of the weight and the number of parts counted.

With the foregoing in mind, the principal object of the present invention is to provide a novel measuring device particularly adaptable for use in conjunction with weighing machines operable to determine two separate measurements and compute the ratio between them.

Another object of the present invention is to provide a novel measuring device particularly adaptable for use in conjunction with weighing machines wherein the number of parts placed on the load platform of the weighing machine may be accurately weighed and counted.

A further object of the present invention is to provide a novel weighing machine wherein, in addition to weighing and counting the number of parts placed on the load platform and determining the weight of a single part, means are also provided to provide a permanent record of these measurements by the use of a novel printing mechanism.

A still further object of the present invention is to provide a novel measuring device particularly adaptable for use in conjunction with weighing machines which may be manufactured easily and cheaply and is entirely efficient and effective in operation and use.

These and other objects of the present invention, and the various features and details of the operation and construction thereof are hereinafter more fully set forth and described with reference to the accompanying drawings in which:

Fig. 1 is an elevational view partially in section illustrating a weighing machine embodying the measuring device of the present invention wherein the measuring device interrelates a unit weighing system and a load weighing system so as to give the ratio between the weights placed on these two systems.

Fig. 2 is a front elevational view of a portion of the unit measuring system;

Fig. 3 is a side elevational view partially in section of the mechanism illustrated in Fig. 2;

Fig. 4 is an enlarged fragmentary elevational view of the tapes and switch mechanism shown in Figs. 2 and 3;

Fig. 5 is an enlarged elevational view partially in section illustrating the load measuring mechanism;

Fig. 7 is an enlarged elevational view partially in section of the measuring device of the present invention used to determine the ratio between the unit measurement and the load measurement;

Fig. 8 is a fragmentary plan view of the measuring device illustrated in Fig. 7;

Fig. 9 is a sectional view taken on line 9—9, Fig. 7, illustrating the adjustable pivot point for the mechanism shown in Fig. 7;

Fig. 11 is a fragmentary elevational view of the printing mechanism used to record the various measurements and the ratio between the load and unit measurement;

Fig. 12 is a plan view of the printing mechanism illustrated in Fig. 11;

Figure 6:
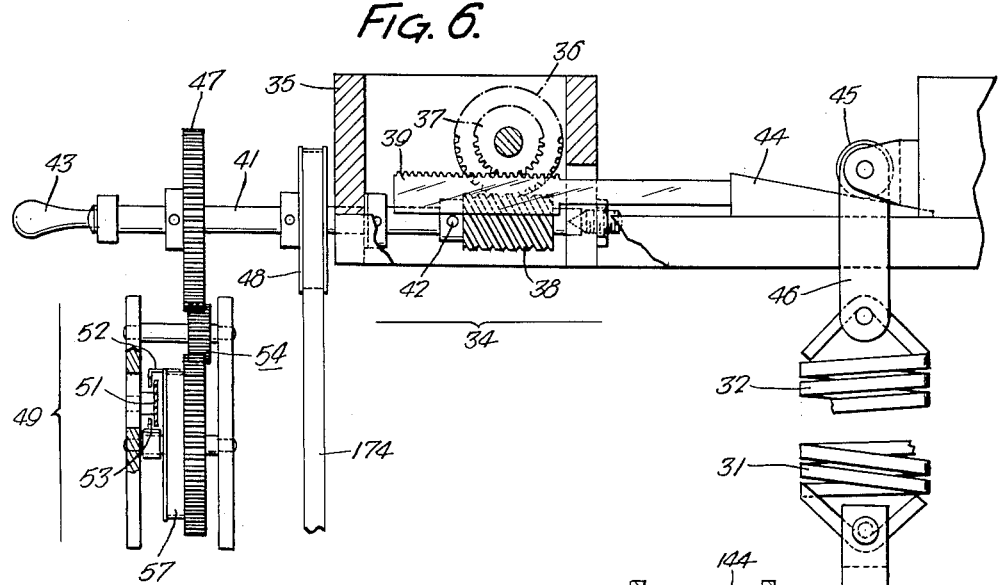
Fig. 6 is a side elevational view partially in section illustrating the means to compensate for any initial deviations in the load mechanism such as a tare load placed on the load platform.

The present invention comprises essentially a device used to determine the ratio between two measurements. In the illustrated embodiment of the present invention, the device is shown in conjunction with a scale or calculating machine such as those used in industrial plants for counting and weighing a plurality of small parts. This scale comprises two separate measuring systems interconnected so that the ratio between the measurements of each of the systems may be readily ascertained. The main weighing system is connected to a load platform on which the articles to be counted are placed and has means associated therewith to compensate for the tare weight of the receptacle containing the articles to be counted. A second weighing system is provided in which a weight equal to one of the articles is placed and, in accordance with the present invention, these two weighing systems are interconnected so that the ratio between the load weight and unit weight is immediately registered.

Referring more specifically to the drawings, and particularly Figs. 1 and 5 thereof, reference numeral 20 designates generally a steelyard which has its lower end connected to the load platform of a scale (not shown). Fixedly secured to the upper end of the steelyard 20 is a yoke or bracket member 21 having an inverted V shaped surface 22 therein which is engaged by a knife edge 23 extending outwardly from each side of a lever 24. The lever 24 is pivotally mounted at one end by means of a knife edge 25 engaging a stationary block 26 secured to the casing 27 of the measuring device. Positioned at the opposite end of the lever 24 is a third knife edge 28 which engages a yoke 29 having its upper end secured, as indicated at 30, to a pair of oppositely wound springs 31 and 32. Thus, as a weight is applied to the load platform of the scale, the lever 24 is pivoted in a clockwise direction about the knife edge 25, thereby pulling downward on the springs 31 and 32.

When the parts to be weighed are placed on the load platform of the scale, a container of some sort is usually provided in which the parts to be weighed are placed. In order to accurately determine the load weight and the ratio between the load weight and the unit weight, means must be provided to compensate for the tare weight of the receptacle containing the articles to be weighed and counted. To this end, compensating means designated generally as 34 are provided to change the initial tension on the springs 31 and 32. The compensating means are partially enclosed in a housing 35 (Fig. 6) in which a pair of spur gears 36 and 37 are mounted for engagement with a worm 38 and rack 39 respectively.

The worm 38 is fixedly secured on a shaft 41 as indicated at 42 so that rotation of the shaft 41 by means of a handle 43 will cause similar rotation of the worm 38 and also due to the spur gears 36 and 37 cause lateral movement of the rack 39. Extending outwardly from the forward end of the rack 39 is a wedge 44 adapted for engagement with a roller 45 secured to the upper end of a bracket 46 which supports the springs 31 and 32. As the wedge 44 is moved forward the bracket 46 is raised thus increasing the initial tension on the springs 31 and 32 and compensating for the tare weight of the receptacle placed onto the load platform, in a similar manner rearward movement of the wedge 44 will decrease the tension on the springs 31 and 32.

A spur gear 47 and pulley 48 are secured to the forward end of the shaft 41 to operate respectively a dial mechanism indicated generally as 49 and a printing mechanism (more fully described hereinafter). The dial mechanism 49 is of the usual type and comprises a scale 51, a pair of pointers 52 and 53 operated through a gear train 54 and pulleys 56 and 57 (Fig. 5).

Pivotally secured to a point on the forward end of the lever 24 is a yoke assembly 61 which interconnects the lever 24 with a second lever 62 as shown in Figs. 1 and 5. The lever 62 is pivotally mounted on a bracket 63 secured to the casing 27 of the measuring device. Extending upwardly from the lever 62 and pivotally secured thereto is a link 64 which in turn has its upper end pivotally mounted at one end of a variable lever 65, the operation of which is more fully described hereinafter. Thus as a weight is applied to the load platform of the scale the lever 24 is pivoted in a clockwise direction about its pivot point 25 as previously described and in turn through the medium of the yoke 61 lever 62 and link 64 pivots the variable lever 65 about its adjustable pivot point 66, more fully described hereinafter.

In accordance with the present invention, a second measuring system is provided which, in the present instance, is operable to determine the unit weight of the parts being weighed. With reference to Figs. 1 and 2 of the drawings, one of the parts to be counted or an equivalent weight is placed in a unit tray 67 supported by means of knife edges 68 extending outwardly from each side of a scale arm 71. The scale arm 71 extends transversely across the measuring device and is pivotally mounted to the casing 27 as indicated at 72. Knife edges 73 extending outwardly from each side of the scale arm 71 at the opposite end thereof support a yoke 74 which in turn is secured to a pair of oppositely wound springs 75 and 76 as indicated at 77 (Figs. 1 and 2). The springs 75 and 76 are secured to a bracket 78 depending upwardly from the lower surface of the casing 27 (Fig. 2). Thus as a weight is placed on the unit tray 67 the scale arm 71 is pivoted in a clockwise direction about its pivot point 72 and exerts a tension on the springs 75 and 76.

Since the measuring system connected to the load platform determines the entire weight of the articles to be counted and the measuring system carrying the unit scale 67 determines the weight of a single article the ratio between these two weights will indicate the number of parts placed on the load platform. To this end the variable lever 65 and adjustable pivot point 66 are provided which are actuated respectively by the load weighing system and the unit weighing system. The load weighing system pivots the variable lever 65 in a counterclockwise direction about the adjustable pivot point 66 as previously described and the unit weighing system positions the adjustable pivot point 66 beneath the variable lever 65 as more fully described hereinafter.

When the sale arm 71 is pivoted in a clockwise direction due to a weight being placed on the unit tray 67 a rack 81 pivotally secured to the scale arm 71 is pulled in an upward direction. The rack 81 engages a spur gear 82 fixedly secured to a shaft 83 which in turn carries an involute cam 84 as illustrated in Figs. 1, 2 and 3. Thus, as the rack 81 is moved upward the involute cam 84 is rotated counterclockwise. The involute cam 84 engages a second involute cam 85 of similar shape fixedly secured on a shaft 86 which carries a pulley 87. In the present instance, cams 84 and 85 have teeth thereon extending around their peripheries and adapted for engagement with each other so that a positive connection is provided between them. This is not necessary however and other means, for example, tapes secured to each of the cams may be used to positively interconnect the cams.

In accordance with the present invention a metal tape 88 passes over the pulley 87 and also a second pulley 89 pivotally mounted at the upper end of the casing 27 (Fig. 2). The tape 88 has a cam surface 92 and 93 (Fig. 3) along either side thereof adaptable to operate a switch 94 carried by a second tape 95 which is mounted on upper and lower pulleys 96 and 97 respectively. The cam surfaces 92 and 93 on the tape 88 are moved upward by means of the rack, spur gear, and involute cam as previously described when a load is placed on the unit scale 67. The switch 94 has a pair of stationary contacts 96 and 97 which are secured to the tape 95 and a central movable contact 99 pivotally mounted to the tape 95 as indicated at 101 and operable by a pair of rollers 102 and 103 engaging the cam surfaces 92 and 93 respectively of the tape 88.

With reference to Fig. 4, upward movement of the tape 88 will pivot a bracket 104 carrying the central movable contact 99 in a clockwise direction about the pivot point 101 thus engaging the contact 99 with the contact 97. In this position upward movement of the tape 95 will pivot the bracket 104 in a counterclockwise direction thereby removing the contact 99 from engagement with the contact 97. In a similar manner, downward movement of the tape 88 will cause the contact 99 to come into engagement with contact 96 until an equal amount of downward movement of the tape 95 releases the contact 99 from engagement with contact 96.

A reversible motor 105 is provided which is operated by the switch 94. Engagement between the contacts 99 and 97 will drive the motor 105 in one direction while engagement between the contacts 99 and 96 will drive the motor 105 in the opposite direction. The reversible motor 105 operates the tape 95 by means of a pinion 106 which engages a spur gear 107 fixedly secured to a shaft 108 on which the pulley 96 is mounted. Furthermore, the motor 105 is operable to position the adjustable pivot point 66 (Fig. 7) by means of a tape 109 secured to the carriage 111 on which the adjustable pivot point 66 is mounted. The tape 109 passes about a shaft 112 rotatably mounted in the casing 27 and carrying a gear 113 which engages the previously mentioned spur gear 107. From the above it will be observed that the position of the tape 88 controls the position of the adjustable pivot point 66. Since the movement of the tape 88 is controlled by the movement of the scale arm 71, a weight placed on the unit tray 67 will move the adjustable pivot point 66 to the left from the zero position as shown in Fig. 1 an amount varying with the weight placed on the unit tray 67.

With reference to Figs. 7, 8 and 9 of the drawings, the variable lever 65 is resiliently supported by means of tapes 115 and 116 adjustably secured to brackets 117 and 118 respectively depending downwardly from the top of the casing 27. The tapes 115 and 116 tend to maintain the variable lever 65 against horizontal and vertical displacement but allow it to be pivoted easily about the adjustable pivot point 66 by means of a downward force exerted on the link 64. In Fig. 7 the lever 65 is shown in its upper limit position. The tapes 116 pass from the bracket 118, under the lever 65, between the pivot point 66 and the lever (see Fig. 9), and are connected to the latter as indicated at 219. The tapes 115, on the other hand, pass from the bracket 117, under the pivot pin 211 which supports the yoke 212 of the link 64, over the lever 65, and are connected to the latter as indicated at 213. It is noted that the displacement of the link 64 is relatively small, so that the illustrated clearance between the pin 211 and the tape 115 is sufficient to prevent interference with the operation. An anti-friction bearing may be provided, as at 214 to prevent frictional interference with the movement. Thus, when a weight is applied to the load platform to displace the link 64 downwardly, the lever 65 is caused to pivot counterclockwise on the fulcrum 66, the right hand extremity of the lever 65 rising above the tape 116, and the left hand extremity falling away from the tape 115. Thus, the fulcrum 66 supports the right hand end of the lever 65, the tapes 116 and the fulcrum 66 provide a small vertical component partially supporting the left hand end of the lever 65 as it pivots counterclockwise, and the tapes 115 provide a horizontal force to counterbalance the horizontal component of the force exerted by the tapes 116. This relieves to a substantial extent the effect of the weight of the lever 65 on the yoke 212, and provides a flexible mounting means for the lever 65.

Positioned beneath the variable lever 65 in a spaced parallel relationship therewith is a track 119 on which the carriage 111 rides. The carriage 111 comprises a frame member 121 which has a lug 122 extending upwardly therefrom on either side supporting the adjustable pivot point 66. Wheels 123 allow the carriage 111 to be moved with a minimum amount of friction over the track 119. The tape 109 which positions the carriage 111 is secured to the carriage at each end thereof as indicated at 124.

As previously described a weight placed in the unit tray 67 will move the adjustable pivot point 66 to the left a distance depending on the amount of weight placed in the unit tray and a weight placed on the load platform of a scale will pull the left end of the variable lever 65 downward an amount depending on the weight placed on the load platform. Thus it will be observed that the vertical movement of any point on the variable lever 65 between the pivot point 66 and the link 64 will depend both on the weight placed on the unit tray and weight placed on the load platform. For a constant weight placed on the unit tray of the measuring device an increase in the amount of weight placed on the load platform will increase the downward vertical movement of any point on the variable lever 65 between the above mentioned limits. Similarly if a constant weight is applied to the load platform of the measuring device an increase in the amount of weight placed in the unit tray will decrease the downward movement of any point between the given limits on the variable lever 65 due to the decrease in the length of the lever arm.

In accordance with the present invention, a position is selected on the variable lever 65 between the link 64 and the extreme left hand limit position of the adjustable pivot point 66 at which the downward movement of the lever is measured. This vertical measurement is then converted into a ratio between the weight on the load platform and the weight in the unit tray. To this end, a bracket 125 (Fig. 7) is secured to the variable lever 65 and has a yoke 126 pivotally mounted thereon as indicated at 127. The lower end of the yoke 126 is secured to the core 128 of a variable transformer 129 so that as the lever 65 is moved downward the core 128 in the variable transformer 129 is moved downward an equal distance. The variable transformer 129 is connected to a motor 131 and a second variable transformer 132, the core of which is raised or lowered by means of the motor 131.

The electrical system employed is a common type of system which is normally balanced electrically and when unbalanced causes operation of a motor which in turn produces a follow-up action. A pair of variable transformers are used to create the balanced and unbalanced conditions. In such a system the primary coils of the two transformers are energized from a common source and each transformer has a pair of secondary coils connected in opposed relation. These two transformers produce a resultant voltage when the core of one of the transformers is actuated and the resultant voltage is amplified and operates a motor which moves the core of the other variable transformer to balance the system.

Figure 10:
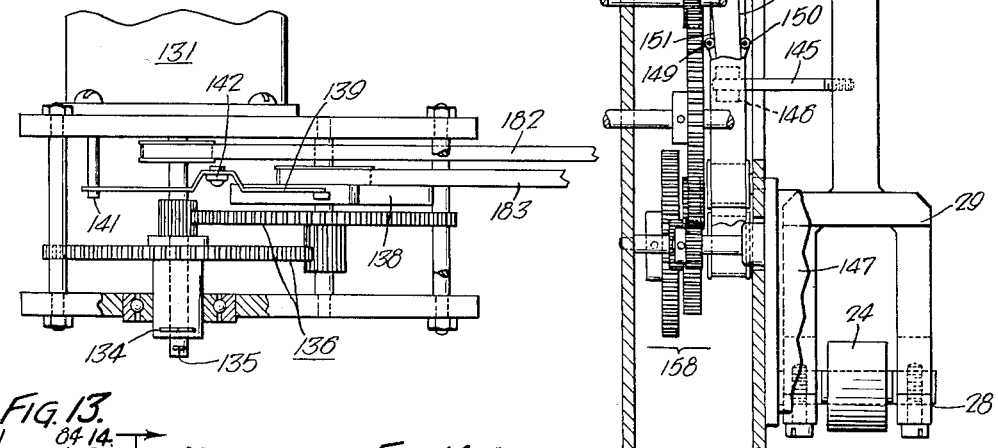
Fig. 10 is a plan view partially in section of the mechanism used to set the dial which indicates the ratio between the load measurement and the unit measurement.

Thus, as the core 128 in the variable transformer 129 is lowered, the motor 131 is operated until the core 133 of the variable transformer 132 is lowered an equal distance. The motor 131 positions pointers 134 and 135 (Fig. 1) by means of a gear train indicated generally as 136 in Fig. 10. The pointers 134 and 135 indicate the ratio between the load weight and the unit weight on a dial 137 on the face of the measuring device. The motor 131 also rotates a cam 138 by means of the above mentioned gear train 136. A cam follower 139 is provided pivotally mounted as indicated at 141 which is raised or lowered as the cam 138 is rotated. Positioned centrally of the cam follower 139 is a tie-rod 142 which is secured to the core 133 at the variable transformer 132 and thus raises or lowers the core 133 when the motor 131 is operated. When the load is removed the armature 128 (Fig. 5) is moved upward and the amplifier in the balance system causes the motor 131 to operate in the reverse direction until the armature 133 is again in balance with the armature 128 and the pointers 134 and 135 are in their zero position.

In accordance with the present invention means are also provided in conjunction with the present measuring device to indicate the total weight of the parts placed on the load platform and also to print the total weight of the parts, the tare weight, the unit weight and the ratio between the total weight of the parts and the unit weight on a ticket to provide a permanent record of each operation of the measuring device. In order to determine the total weight of the parts placed on the load platform the downward movement of the yoke 29 is measured by means of a pair of tapes 143 and 144 which are similar in operation to the previously mentioned tapes 88 and 95.

Referring to Fig. 5 the inner tape 143 is directly connected to the yoke 29 by means of a pin 145 extending outwardly from the side of the yoke 129 and engaging a bracket 146 secured to the tape 143. The outer tape 144 is driven by means of a motor 147 as indicated in Fig. 11 and carries a switch 148 thereon which operates the motor 147. Rollers 149 and 150 engaging, respectively, cam surfaces 151 and 152 on the inner tape 143 as indicated in Figs. 5 and 6 close or open the switch 148 in a manner similar to that described for the switch 94. The motor 147 also positions a pair of hands 155 and 156 (Fig. 1) which indicate the total weight of the parts placed on the load platform on a dial 157. The connection between the motor 147 and the hands 155 and 156 is illustrated in Fig. 12 and comprises a gear train 158 operatively connecting the motor 147 with a shaft 158a. The hands 155 and 156 are driven respectively by the shaft 158a and a second gear train 159. Furthermore, the motor 147 also positions a pair of printing wheels 161 which are operable to print the total weight of the parts placed on the load platform.

In order to print the weight of the article placed on the unit tray 67, a motor 162 is provided which by means of gears 163 and 164, and a belt 165 positions a printing wheel 166 supported in axial alignment with the above mentioned printing wheel 161. The motor 162 is controlled by inner and outer tapes 168 and 169 respectively which carry and operate a switch 170 similar to the previously mentioned switches 94 and 148. The inner tape 168 is positioned by means of a pulley 171 fixedly secured to the shaft 86 on which the involute cam 85 (Fig. 2) is secured. The outer tape 169 is positioned by means of a pulley 172 secured adjacent the gear 164.

Printing wheels 173 are provided to indicate the tare weight placed on the load platform. These printing wheels 173 (Fig. 12) are rotatably positioned by means of tapes 174 and 175 operable by rotation of the shaft 41. The tape 174 passes over the pulley 48 fixedly mounted on the shaft 41 (Figs. 6 and 11) and by means of gears 176 and 177 rotates a shaft 178 on which a pulley 179 is mounted. The tape 175 is driven by the pulley 179 and thus the two tapes together position the printing wheels 173 (Fig. 12). In a like manner, printing wheels 181 which indicate the number of pieces on the load platform as a result of ratio between the parts placed on the load platform and the unit weight placed on the unit tray are operable by means of tapes 182 and 183 driven by pulleys 184 and 185 respectively. The pulleys 184 and 185 in turn are driven by the motor 131 which also positions the hands 134 and 135 on the dial 137.

Figure 13:
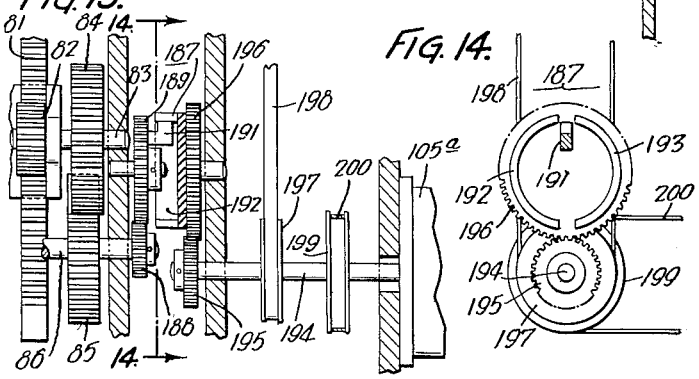
Fig. 13 is a sectional view illustrating a modified switch arrangement for positioning the adjustable pivot point; and, Fig. 14 is a sectional view taken on line 14—14, Fig. 13.
Figure 14:
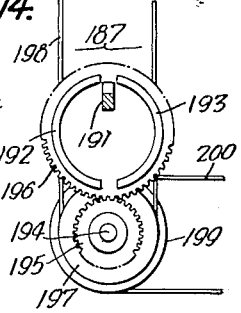

Figs. 13 and 14 illustrate a modified form of switch 187 used to control the motor 105a which in turn positions the adjustable pivot point 66 beneath the variable lever 65. In this instance the shaft 86 (Fig. 2) on which the involute cam 85 is mounted has a pinion 188 fixedly secured thereto which drives a gear 189. The gear 189 carries a switch arm 191 operable to engage generally semi-circular contact plates 192 and 193. As the involute cam 85 is rotated due to a weight being placed on the unit tray 67, as previously described, the gear 189 is also rotated which in turn rotates the switch arm 191 and brings it into engagement with the contact plate 192. This completes a circuit to the reversible motor 105a and operates the motor until contact is broken between the switch arm 191 and the contact plate 192.

Secured to the outer end of the shaft 194 of the motor 105a is a pinion 195 which engages a gear 196 carrying the switch plates 192 and 193. As the motor 105a is operated the contact plates 192 and 193 are rotated by means of the gear 196 until contact is broken between the switch arm and the contact plates. At the same time a pulley 197 fixedly secured to the shaft 194 and carrying the tape 198 is also rotated by the motor 105a. The upper end of the tape 198 passes over the shaft 112 and thus positions the adjustable pivot point 66 as previously described. A second pulley 199 is also secured to the shaft 194 and has a tape 200 passing over the pulley 199 and causes rotation of the printing wheel 166 which indicates the weight of the article placed on the unit tray 67.

As the weight is removed from the unit tray 67 the involute cam 85 is rotated in the opposite direction which causes the switch arm 191 to come in contact with the contact plate 193. This reverses the operation of the motor 105a and the motor continues operating until the contact plate 193 is withdrawn from engagement with the switch arm 191. While the switch 187 has been described with reference to operating the motor which positions the adjustable pivot point 66 and is used to replace the switch 94, it will be readily apparent that a switch construction similar to this may be used in place of the previously mentioned switches 148 and 170.

From the foregoing it will be observed that the present invention provides a novel measuring device particularly adaptable for use in conjunction with weighing machines operable to determine two separate measurements and compute the ratio between them. Furthermore, the present invention provides a novel measuring device which in addition to weighing and counting the number of parts placed on the load platform of a scale and determining the weight of a single part will also provide a permanent record of these measurements.

While a particular embodiment of the present invention has been illustrated and described herein, it is not intended to limit the invention to such disclosures and changes and modifications may be incorporated and embodied therein within the scope of the following claims.

I claim:

1. In apparatus for determining a ratio between two quantitative measurements, two separate measuring devices each independently operable to produce a given deflection according to the magnitudes of said measurements, a housing, mechanism including a lever in said housing actuatable by deflection of both of said devices to a position indicative of the ratio of said measurements, flexible mounting means for said lever comprising a pair of tapes, one of said tapes being carried at one end by said housing adjacent one end of the lever, passing along one side of the lever in confronting relation thereto, and terminating in a connection to said lever at the opposite end of the latter, the other of said tapes being carried at one end by said housing adjacent said opposite end of the lever, passing along the opposite side of the lever in confronting relation thereto, and terminating in a connection to said lever at the said one end of the latter, said tapes being operable to position the lever in said housing and prevent the lever from affecting operation of said measuring devices, and means actuated by movement of said lever operable to measure the ratio between said two measurements.

2. In apparatus for determining a ratio between two quantitative measurements, two separate measuring devices each independently operable to produce a given deflection according to the magnitudes of said measurements, a housing, mechanism including a lever in said housing mounted to pivot about an adjustable fulcrum, means to position said fulcrum longitudinally of the lever according to the deflection produced by one of said measuring devices, means to pivot one end of said lever about said fulcrum according to the deflection produced by the other of said measuring devices, a member carried by said lever between said fulcrum and said one end thereof, and means actuated by movement of said member operable to register the ratio between said two measurements.

3. In apparatus for determining a ratio between two quantitative measurements, two separate measuring devices each independently operable to produce a given deflection according to the magnitudes of said measurements, a housing, mechanism including a lever in said housing, a fulcrum mounted in said housing about which said lever can pivot, means operable to move said fulcrum longitudinally with respect to said lever toward one end of said lever upon an increase in deflection of one of said measuring devices and toward the other end of said lever upon a decrease in said deflection, means to pivot said one end of said lever about said fulcrum according to the deflection produced by the other of said measuring devices, a member carried by said lever between said fulcrum and said one end thereof, and means actuated by movement of said member operable to register the ratio between said two measurements.

4. In apparatus for determining a ratio between two quantitative measurements, two separate measuring devices each independently operable to produce a given deflection according to the magnitudes of said measurements, a housing, mechanism including a lever in said housing mounted to pivot about an adjustable fulcrum, means to position said fulcrum longitudinally of the lever according to the deflection produced by one of said measuring devices, means to pivot one end of said lever about said fulcrum according to the deflection produced by the other of said measuring devices, a member carried by said lever between said fulcrum and said one end thereof, flexible mounting means carried by said housing in engagement with said lever operable to position the lever in said housing and prevent the lever from affecting operation of said measuring devices, and means actuated by movement of said member operable to register the ratio between said two measurements.

5. In apparatus for determining a ratio between two quantitative measurements, two separate measuring devices each independently operable to produce a given deflection according to the magnitudes of said measurements, a housing, mechanism including a lever in said housing mounted to pivot about an adjustable fulcrum, means to position said fulcrum longitudinally of the lever according to the deflection produced by one of said measuring devices, means to pivot one end of said lever about said fulcrum according to the deflection produced by the other of said measuring devices, a member carried by said lever between said fulcrum and said one end thereof, flexible mounting means for said lever comprising a pair of tapes each having one end thereof secured to the lever and the other end thereof carried by said housing to position the lever in said housing and prevent the lever from affecting operation of said measuring devices, and means actuated by movement of said member operable to register the ratio between said two measurements.

6. In apparatus for determining a ratio between two quantitative measurements, two separate measuring devices each independently operable to produce a given deflection according to the magnitudes of said measurements, a housing, mechanism including a lever in said housing, a fulcrum mounted in said housing about which said lever can pivot, means operable to move said fulcrum longitudinally with respect to said lever toward one end of said lever upon an increase in deflection of one of said measuring devices and toward the other end of said lever upon a decrease in said deflection, means to pivot said one end of said lever about said fulcrum according to the deflection produced by the other of said measuring devices, a member carried by said lever between said fulcrum and said one end thereof, flexible mounting means for said lever comprising a pair of tapes each having one end thereof secured to the lever and the other end thereof carried by said housing to position the lever in said housing and prevent the lever from affecting operation of said measuring devices, and means actuated by movement of said member operable to register the ratio between said two measurements.

7. In apparatus for determining a ratio between two quantitative measurements, two separate measuring devices each independently operable to produce a given deflection according to the magnitudes of said measurements, a housing, mechanism including a lever in said housing mounted to pivot about an adjustable fulcrum, means to position said fulcrum longitudinally of the lever according to the deflection produced by one of said measuring devices, means to pivot one end of said lever about said fulcrum according to the deflection produced by the other of said measuring devices, a member carried by said lever between said fulcrum and said one end thereof, indicating means to indicate the ratio between said two measurements, and mechanism interconnecting said member and said indicating means operable to actuate said indicating means upon movement of said lever to a position indicative of said ratio.

8. In apparatus for determining a ratio between two quantitative measurements, two separate measuring devices each independently operable to produce a given deflection according to the magnitudes of said measurements, a housing, mechanism including a lever in said housing, a fulcrum mounted in said housing about which said lever can pivot, means operable to move said fulcrum longitudinally with respect to said lever toward one end of said lever upon an increase in deflection of one of said measuring devices and toward the other end of said lever upon a decrease in said deflection, means to pivot said one end of said lever about said fulcrum according to the deflection produced by the other of said measuring devices, a member carried by said lever between said fulcrum and said one end thereof, indicating means to indicate the ratio between said two measurements, and mechanism interconnecting said member and said indicating means operable to actuate said indicating means upon movement of said lever to a position indicative of said ratio.

9. In apparatus for determining a ratio between two quantitative measuremens, two separate measuring devices each independently operable to produce a given deflection according to the magnitudes of said measurements, a housing, mechanism including a lever in said housing mounted to pivot about an adjustable fulcrum, means to position said fulcrum longitudinally of the lever according to the deflection produced by one of said measuring devices, means to pivot one end of said lever about said fulcrum according to the deflection produced by the other of said measuring devices, a member carried by said lever between said fulcrum and said one end thereof, indicating means to indicate the ratio between said two measurements, an electric circuit including a pair of variable core transformers and a reversible motor controlled by said transformers, means interconnecting said lever with one of said transformers operable upon movement of said lever to variably position the core of said transformer and vary the inductance and operate the motor, mechanism connecting said motor with said indicating means to indicate the ratio between said measurements, and means actuatable by said indicating means to vary the inductance of the other transformer to stop the motor.

10. In apparatus for determining a ratio between two quantitative measurements, two separate measuring devices each independently operable to produce a given deflection according to the magnitudes of said measurements, a housing, mechanism including a lever in said housing, a fulcrum mounted in said housing about which said lever can pivot, means operable to move said fulcrum longitudinally with respect to said lever toward one end of said lever upon an increase in deflection of one of said measuring devices and toward the other end of said lever upon a decrease in said deflection, means to pivot said one end of said lever about said fulcrum according to the deflection produced by the other of said measuring devices, a member carried by said lever between said fulcrum and said one end thereof, indicating means to indicate the ratio between said two measurements, an electric circuit including a pair of variable core transformers and a reversible motor controlled by said transformers, means interconnecting said lever with one of said transformers operable upon movement of said lever to variably position the core of said transformer and vary the inductance and operate the motor, mechanism connecting said motor with said indicating means to indicate the ratio between said measurements, and means actuatable by said indicating means to vary the inductance of the other transformer to stop the motor.

References Cited in the file of this patent

UNITED STATES PATENTS

| | | |
|---|---|---|
| 1,273,414 | Schantz | July 23, 1918 |
| 1,459,886 | Hammond | June 26, 1919 |
| 1,533,530 | Wheatley et al. | Apr. 14, 1925 |
| 1,764,274 | Mittendorf | June 17, 1930 |
| 1,800,741 | Mittendorf | Apr. 14, 1931 |
| 1,952,171 | Jones | Mar. 27, 1934 |
| 1,976,726 | House | Oct. 16, 1934 |
| 2,036,014 | Borger | Mar. 31, 1936 |
| 2,114,185 | Havourd et al. | Apr. 12, 1938 |
| 2,229,156 | Wertheimer | Jan. 21, 1941 |
| 2,313,179 | Sprecker | Mar. 9, 1943 |
| 2,316,627 | Sang | Apr. 13, 1943 |
| 2,371,040 | Fisher | Mar. 6, 1945 |
| 2,617,641 | Marshall | Nov. 11, 1952 |
| 2,643,055 | Sorteberg | June 23, 1953 |

FOREIGN PATENTS

| | | |
|---|---|---|
| 921,978 | France | May 23, 1947 |